US006642829B1

(12) United States Patent
Carmena

(10) Patent No.: US 6,642,829 B1
(45) Date of Patent: Nov. 4, 2003

(54) HIGH-VOLTAGE TRANSFORMER

(75) Inventor: Ángel Díaz Carmena, Alcorcón (ES)

(73) Assignee: Sociedad Espanola de Electromedicina y Calidad, S.A., Madrid (ES)

( * ) Notice: Subject to any disclaimer, the term of this patent is extended or adjusted under 35 U.S.C. 154(b) by 0 days.

(21) Appl. No.: 09/889,534

(22) PCT Filed: Nov. 25, 1999

(86) PCT No.: PCT/ES99/00382

§ 371 (c)(1),
(2), (4) Date: Aug. 31, 2001

(87) PCT Pub. No.: WO00/42624

PCT Pub. Date: Jul. 20, 2000

(30) Foreign Application Priority Data

Jan. 18, 1999 (ES) .............................................. 9900089

(51) Int. Cl.[7] .......................... H02M 7/00; H01F 27/28

(52) U.S. Cl. ......................... 336/182; 363/67; 363/128; 363/126; 336/180

(58) Field of Search ................................ 336/185, 180, 336/182; 363/67–70, 124, 125

(56) References Cited

U.S. PATENT DOCUMENTS

| | | | | | |
|---|---|---|---|---|---|
| 4,587,606 | A | * | 5/1986 | Sanada | 363/68 |
| 5,225,971 | A | * | 7/1993 | Spreen | 363/17 |
| 5,576,681 | A | * | 11/1996 | Sander et al. | 336/208 |
| 5,917,396 | A | * | 6/1999 | Halser, III | 336/180 |
| 6,026,004 | A | * | 2/2000 | Cross | 363/68 |
| 6,150,914 | A | * | 11/2000 | Borho et al. | 336/180 |

* cited by examiner

*Primary Examiner*—Anh Mai
(74) *Attorney, Agent, or Firm*—Klauber & Jackson

(57) ABSTRACT

The invention relates to a high-voltage transformer consisting of conventional elements disposed in two different groups, namely positive voltage elements (1–5) and negative voltage elements (1'–5'), both types of elements being separated by a single insulating barrier (6). One of the ends of all elements has a ground level or "zero voltage" increasing progressively towards the other end in the positive voltage elements and decreasing progressively in the negative voltage elements in such a way that the elements in each group have equipotential voltages at the same level or distance from the ground level. Said structure eliminates parasitic capacitances and makes it possible to mount the elements very close to each other thereby considerably reducing size and consequently costs.

7 Claims, 2 Drawing Sheets

A-B

HIGH-VOLTAGE TRANSFORMER

OBJECT OF THE INVENTION

The invention that is being dealt with consists in a high voltage transformer the goal of which is to considerably reduce the size and the price thereof.

Obviously, the invention can be used in all those applications where a high kilovoltage supply is being required, both in direct and in high or low frequency alternate current.

BACKGROUND OF THE INVENTION

Conventionally, the use of high kilovoltage transformers the design of which presents a maximum difficulty in achieving the electrical insulation between the various elements (transformers, high voltage switches, rectifiers, voltage dividers, dischargers, etc.) they are composed of, is more than known. Insulation thereof is conventionally made by three different manners:

1. Filling, at vacuum and in a dry environment, the whole inside of the tank or housing containing the various elements of the transformer with a liquid or gaseous fluid which is usually silicone oil or mineral oil due to the low cost thereof.

2. Using solid insulating parts as there are plastics, glasses, porcelains, resins, etc.

3. Vacuum encapsulating the whole assembly with high voltage insulating silicones or resins.

In any of these three manners of making the insulation, it is necessary to keep some minimum distances between the various elements composing the transformer. This minimum distance depends on the voltage applied between the various elements so that it is necessary to keep a minimum insulation distance between the points of major voltage, which involves in the majority of the cases, the insulation distance becomes excessive for achieving insulation between the points of minor voltage. The final consequence is that the elements occupy a very high volume, whereby this volume must moreover be covered with the insulating material, a fact which considerably increases the weight and, especially, increases the cost of the transformer.

Furthermore, this design for achieving minimum distances, renders the assembly of the various elements of the transformer difficult, a fact which equally increases its cost.

The U.S. Pat. No. 4,587,606 describes a secondary winding divided into a plurality of sections provided around a primary winding of the air-core type. First and second diode groups are disposed on four substrates which surround the secondary winding. Diodes in each of the first and second diode groups are disposed on two adjacent substrates so that these diodes are connected in series so as to have the same polarity direction, respectively.

The first and second diode groups are respectively divided into a plurality of diode sections. Winding start ends and winding finishing ends are coupled between the respective two adjacent diode sections.

The diode sections disposed on each substrate are arranged to be spaced apart along the axial direction of the primary winding. One of the diode sections to which induced voltages of the winding sections are applied is disposed on two adjacent substrates, and the other diode section is disposed on the other two adjacent substrates. Positions of these diode sections are shifted along the axial direction of the primary winding. Therefore, the diode sections to which the induced voltages of the winding sections are applied are disposed on different substrates and are not on the same plane.

The Japanese patent application 6333754 A describes a transformer for cycloconverter to provide a transformer with equal factors of resistance and leakage reactance in positive and negative groups of windings.

In a first constitution, a conductor in a positive group winding and a conductor in a negative group winding are turned double in an axial direction on a core leg at the same time.

In a second constitution, the positive group winding and the negative group winding are put on separate divisions in an axial direction of the core leg. Then, a power-supply winding is split into two and they are mounted around each outer boundary of the positive and negative group windings.

DESCRIPTION OF THE INVENTION

To solve the afore indicated inconveniences, the invention has developed a new high voltage transformer which is characterized in that the conventional elements it is constituted of are arranged in two differentiated groups, on the one hand the elements having positive voltage and, on the other, the elements having negative voltages, both groups being separated by insulating means.

Furthermore, the arrangement of the elements provides that they are advantageously designed in such a manner that one of the ends of all thereof, have ground level or “zero” voltage. This voltage progressively increases towards the opposed end in the elements having positive voltages, and progressively decreases in the elements having negative voltages; all this in such a manner that, at an equal distance from ground level, the elements of each group have equipotential voltages.

This structure has the great advantage that the elements of one same group do not need insulation between themselves, so that the distance which is to separate them is considerably reduced, and, furthermore, the elements occupying the same area of potential do not at all have an influence on the stray capacitance, so that there are no limitations neither in respect of their proximity nor in respect of the opposed surfaces between them.

Thus, by means of the invention, as the elements are designed such that their voltage levels are in accordance with the area of potential which they occupy, it is possible to bring the elements nearer to each other, so that the volume is considerably reduced and, thus, the insulator filling the inside of the housing or tank of the transformer, is considerably reduced.

As a consequence of this reduction of the volume, a considerable reduction of the weight is achieved, due to the fact that the tank is of smaller dimensions and a smaller quantity of filling insulator is required.

Another of the advantages of the present invention is the reduction of the stray capacitance which eliminates some undesirable side effects.

The progressive increase of the voltage in the elements having a positive voltage, and the progressive decrease of the voltage in the elements having a negative voltage, are linear.

Advantageously, the ground level or “zero voltage”, is located in the area where the low voltage input signals are located.

In a preferred embodiment, the “zero voltage” level is located on the upper side of the transformer, such that the maximum level of potential is defined at the lower ends of the high voltage switches.

The insulating means separating the two groups of elements, are established by one single solid insulating means, a fact which considerably simplifies the assembly of the various elements of the transformer at the same time as it reduces its cost.

Another feature of the invention resides in the fact that it has means for minimizing the stray capacitance between the elements of one group and the elements of the other. These means are determined by the arrangement presented by the various elements of one group and the other; said elements are located in such a way that the surface of the elements of one group opposed to the surface of the elements of the other group, is minimum.

By means of the invention, the number of supporting and electrical insulation parts as well as manpower needed for assembling is reduced.

As a consequence of the above, it is evident that the invention considerably reduces the total cost of the tank, as well as that of the storage and transport thereof.

Hereafter, so as to facilitate a better understanding of this description and forming an integral part thereof, a series of figures in which the object of the invention is represented in an illustrative, non-limiting way, is attached hereto.

DESCRIPTION OF A PREFERRED EMBODIMENT OF THE INVENTION

Figure 1:
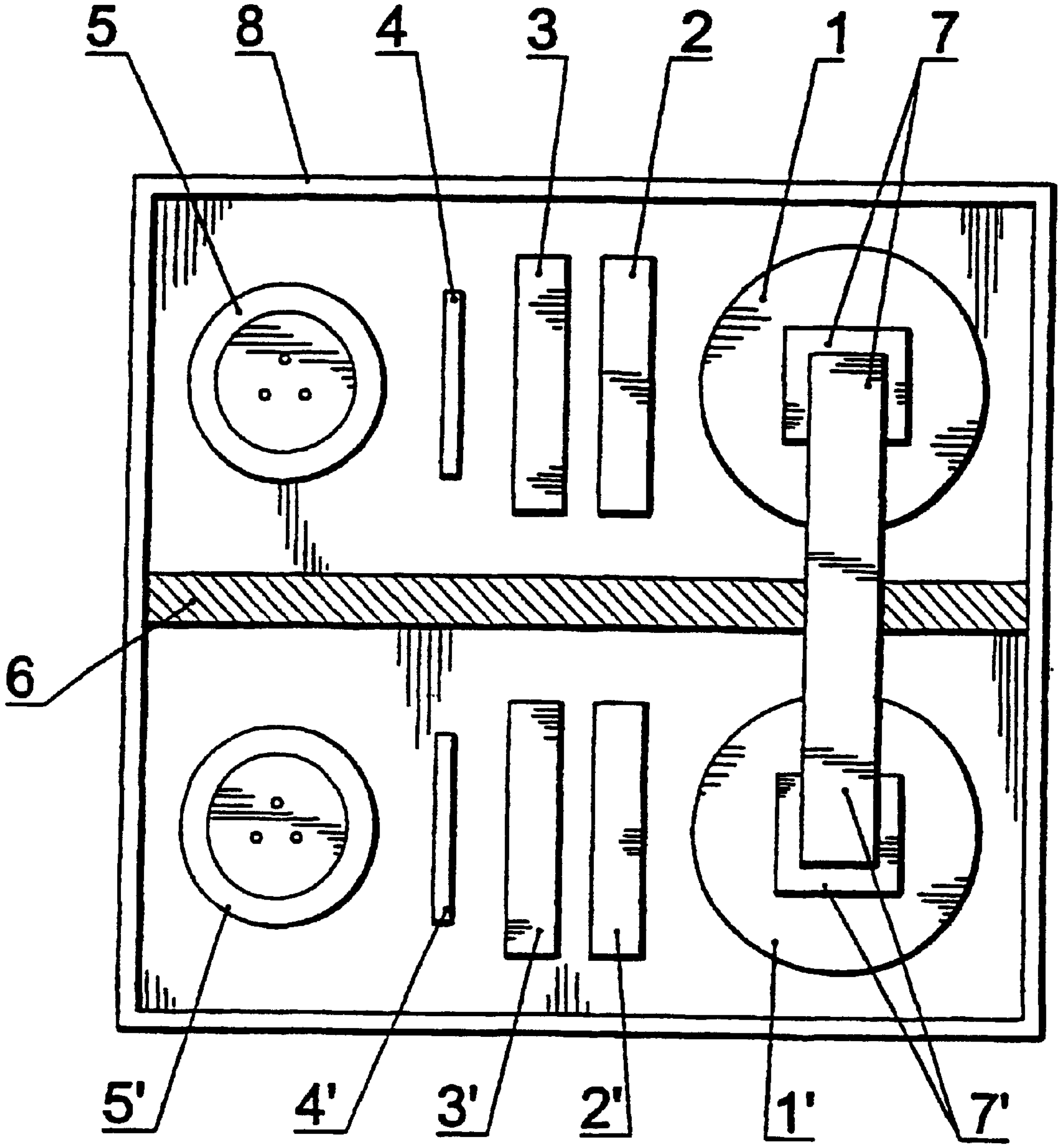
FIG. 1 shows a schematic top plan view of a possible embodiment of the transformer of the invention. In this figure the upper surface or cover of the housing or, tank of the transformer has been removed.

Hereinafter, a description of the invention will be made on the basis of the aforementioned figures.

The transformer of the invention presents as a characteristic the fact that the conventional elements it is comprised of, are arranged in two differentiated groups, in such a manner that, on one side, there are situated the elements with positive voltages and, on the other, the elements with negative voltages.

For this purpose, in a longitudinal half of the transformer there are arranged: a high voltage transformer 1 with its magnetic core 7, a rectifier 2, a filter 3, a resistive divider 4 and an anode switch 5 which constitute the elements supporting positive voltages.

In the other longitudinal half; there are arranged, a high voltage transformer 1' with its magnetic core 7', a rectifier 2', a filter 3', a resistive divider 4', and the cathode switch 5' which constitute the elements supporting negative voltages.

Figure 2:
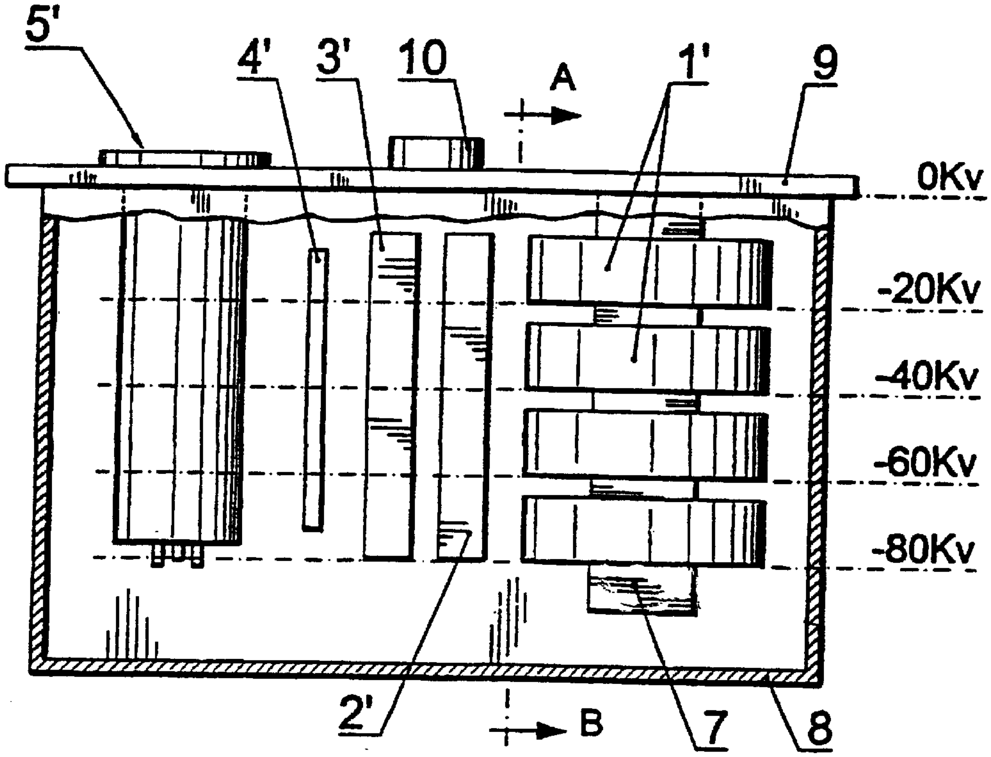
FIG. 2 shows a side view of the transformer shown in the preceding figure, in which the lateral surface has been removed so as to clearly appreciate the arrangement of the various elements.
Figure 3:
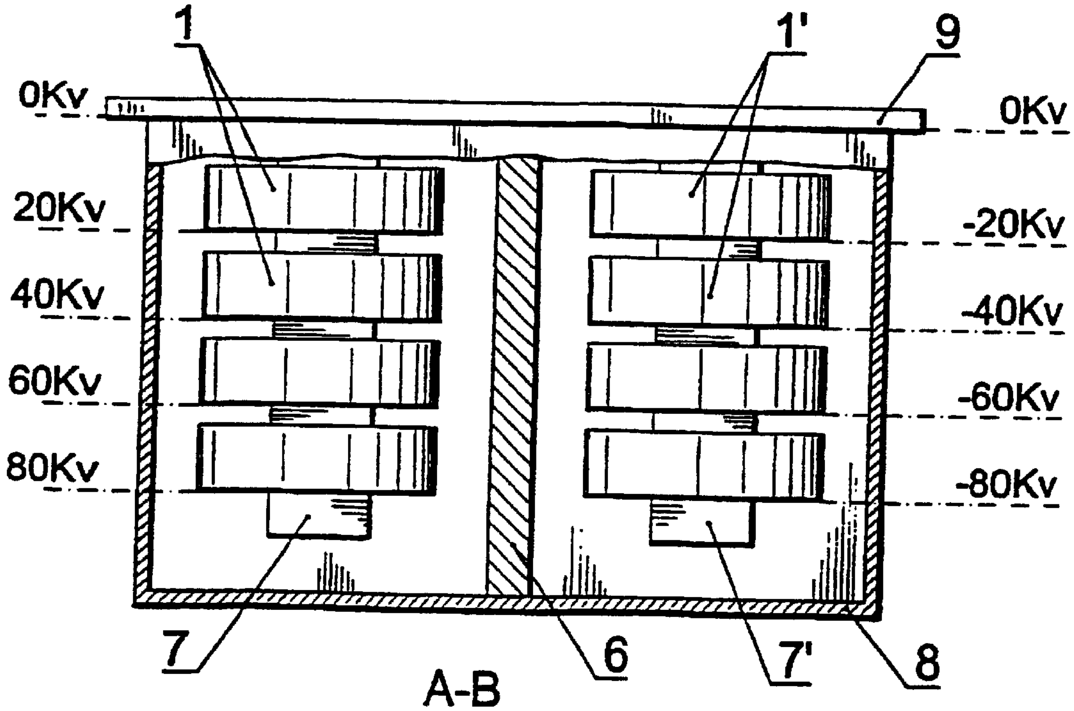
FIG. 3 shows a view in accordance with section A–B of the preceding figure.

Between both groups, there is arranged a solid insulating means (6) furnishing correct insulation between the two groups, whereas insulation between the various elements of each group is achieved by means of a fixing to a "zero voltage" or ground level on the upper side, which is progressively increased towards the lower end in the elements with positive voltage and which progressively decreases in the elements with negative voltages, in such a way that at one same distance from ground level, the elements of each group have equal voltages as represented in FIGS. 2 and 3 wherein voltage levels of 0±20 kV, ±40 kV, ±80 kV have been marked.

Hereby, the potential becomes linearly increased as from the level of 0 Volt downwards, whereby the maximum level of potential is defined by the lower ends of the switches 5 and 5'.

Achievement of equipotential levels permits the elements occupying the same level of potential to be brought near to each other until almost contacting each other, as they do not need insulators and do not at all have an influence on the stray capacitance, and there are thus no limitations neither in respect of their proximity nor in respect of the opposed surfaces therebetween, so that the total volume of the transformer is considerably reduced.

Furthermore, as can be appreciated in FIG. 1, the surface of the elements of one group being opposed to the opposite surface of the elements of the other group, is minimum, such that the stray capacitances are minimized.

All described elements remain included in housing 8 which is closed at its upside by cover 9 constituting the point of zero voltage wherein low voltage input 10 is arranged. Said low voltage input is negligible when compared to the high voltage being generated at the various levels, and can therefore be considered as zero voltage level.

As has been described before in chapter Background of the Invention, the inside of the tank or housing 8 is filled with an insulating material which in the embodiment is silicone oil or mineral oil, and as a matter of example it may be pointed out that the amount of this insulator needed for filling the whole of the volume, is of 4 liters which in comparison to the 36 liters needed by conventional transformers, represents a very high reduction in volume with the subsequent saving represented thereby.

Obviously, as already stated in chapter Background of the Invention, the insulator being used can be materialized by means of vacuum encapsulating the whole of the assembly with high voltage insulating silicones or resins.

What is claimed is:

1. A high voltage transformer having a plurality of elements for voltage transformers, said elements comprising:

a high voltage transforming means (1, 1'), a rectifier (2, 2'), a filter (3, 3'), a resistive divider (4, 4), a high voltage switch (5, 5'), a magnetic core (7, 7'), a low voltage input (10), wherein each rectifier, filter, resistive divider, high voltage switch, magnetic core, has a first end and a second end, each first end being connected to zero voltage level;

each second end being opposite to each first end; said rectifiers, filters, resistive dividers, high voltage switches, magnetic cores, are arranged in two differentiated groups, a first group comprising positive voltage elements and a second group comprising negative voltage elements; the positive voltage elements are separated from the negative voltage elements by solid insulating means in two insulated chambers;

voltage towards the second end in each of said elements: progressively increases in the positive voltage elements and;

progressively decreases in the negative voltage elements; so that, at an equal distance from zero voltage level, the elements of each group have equipotential voltages.

2. A high voltage transformer according to claim 1, wherein the progressive increase of voltage in the positive voltage elements and the progressive decrease of voltage in the negative voltage elements are both linear.

3. A high voltage transformer according to claim 1, wherein the zero voltage level is located in an area where signals of the low voltage input are located.

4. A high voltage transformer according to claim 3, wherein the zero voltage level is located at an upper side of the transformer.

5. A high voltage transformer according to any of claims 1–3 or 4, wherein maximum level of potential is defined at lower ends of the high voltage switches.

6. A high voltage transformer according to claim 1, wherein the two groups are separated by a single solid insulating means.

7. A high voltage transformer according to claim 1, further comprising means for minimizing stray capacitances between the first group elements and the second group elements, by arranging said groups so that only a very small surface of the first group is opposed to the second group.

* * * * *

US006642829C1

(12) EX PARTE REEXAMINATION CERTIFICATE (8530th)

United States Patent

Carmena

(10) Number: US 6,642,829 C1

(45) Certificate Issued: Sep. 13, 2011

(54) HIGH-VOLTAGE TRANSFORMER

(75) Inventor: Ángel Díaz Carmena, Alcorcón (ES)

(73) Assignee: Sociedad Espanola de Electromedicina y Calidad, S.A., Madrid (ES)

Reexamination Request:
No. 90/011,475, Feb. 11, 2011

Reexamination Certificate for:

| | |
|---|---|
| Patent No.: | **6,642,829** |
| Issued: | **Nov. 4, 2003** |
| Appl. No.: | **09/889,534** |
| Filed: | **Aug. 31, 2001** |

(22) PCT Filed: Nov. 25, 1999

(86) PCT No.: PCT/ES99/00382

§ 371 (c)(1), (2), (4) Date: Aug. 31, 2001

(87) PCT Pub. No.: WO00/42624

PCT Pub. Date: Jul. 20, 2000

(51) Int. Cl.
*H02M 7/00* (2006.01)
*H01F 27/28* (2006.01)

(52) U.S. Cl. .......................... 336/182; 336/180; 363/67; 363/126; 363/128

(58) Field of Classification Search ........................ None
See application file for complete search history.

(56) References Cited

U.S. PATENT DOCUMENTS

| | | | |
|---|---|---|---|
| 5,257,304 | A | 10/1993 | Sireul et al. |
| 5,602,897 | A | 2/1997 | Kociecki et al. |

*Primary Examiner*—Margaret Rubin

(57) ABSTRACT

The invention relates to a high-voltage transformer consisting of conventional elements disposed in two different groups, namely positive voltage elements (1-5) and negative voltage elements (1'-5'), both types of elements being separated by a single insulating barrier (6). One of the ends of all elements has a ground level or "zero voltage" increasing progressively towards the other end in the positive voltage elements and decreasing progressively in the negative voltage elements in such a way that the elements in each group has equipotential voltages at the same level or distance from the ground level. Said structure eliminates parasitic capacitances and makes it possible to mount the elements very close to each other thereby considerably reducing size and consequently costs.

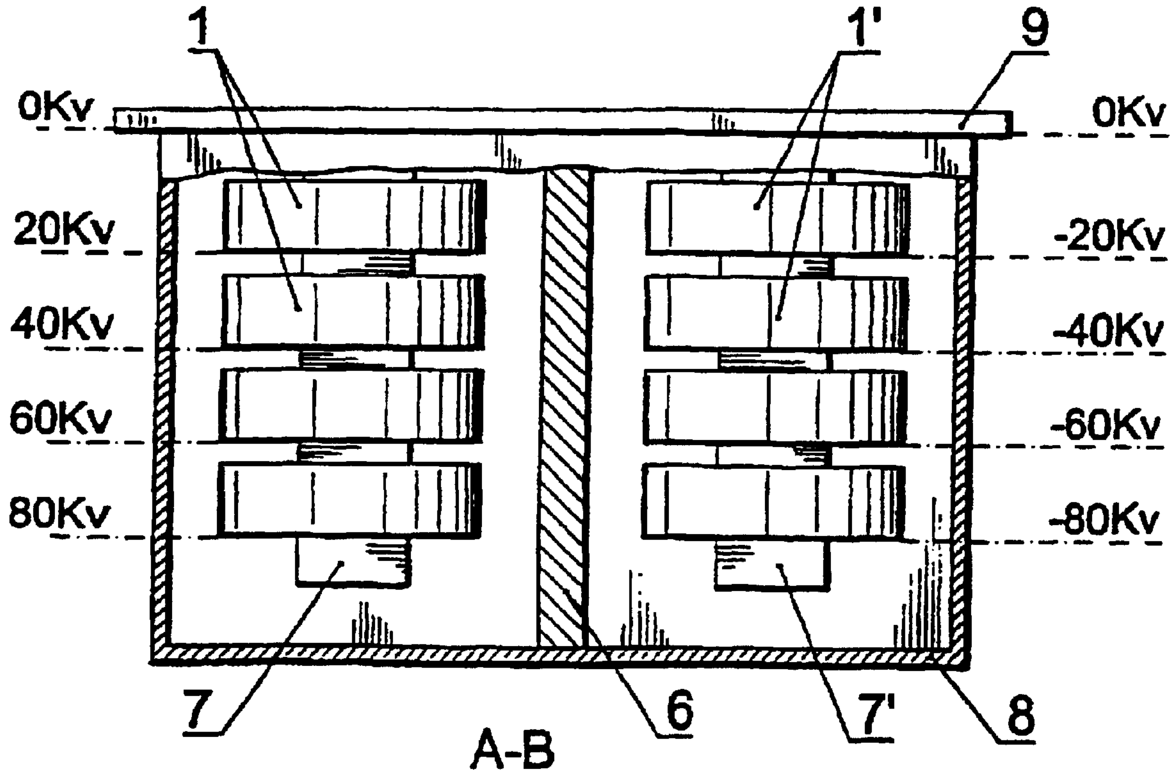

A-B

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *